Oct. 26, 1965  F. W. TANNER, JR., ETAL  3,214,339
ANTIBIOTIC PA 1008 AND METHOD OF PRODUCTION
Filed June 19, 1958
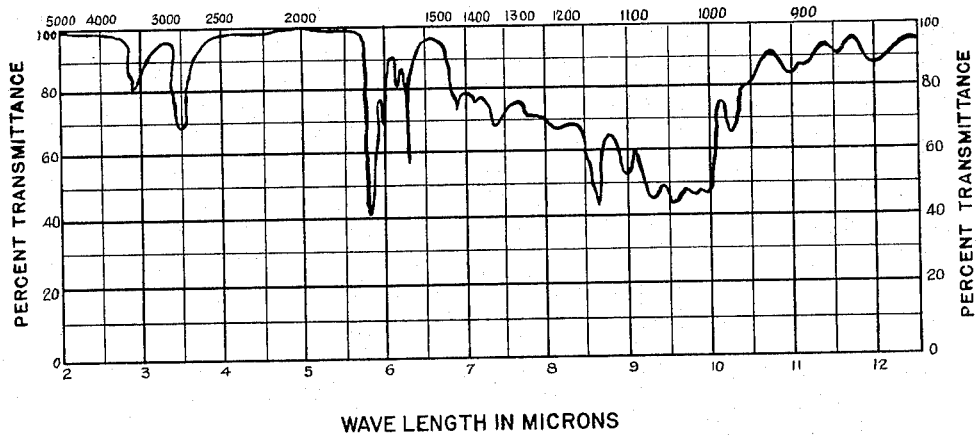
INFRARED ABSORPTION SPECTRUM OF PA 1008
INVENTORS
FRED W. TANNER JR.
JOHN B. ROUTIEN
BY Connolly and Hutz
ATTORNEYS

United States Patent Office 3,214,339
Patented Oct. 26, 1965

3,214,339
ANTIBIOTIC PA 1008 AND METHOD OF PRODUCTION
Fred W. Tanner, Jr., Baldwin, N.Y., and John B. Routien, Tenafly, N.J., assignors to Chas. Pfizer & Co. Inc., New York, N.Y., a corporation of Delaware
Filed June 19, 1958, Ser. No. 743,183
4 Claims. (Cl. 167—65)

This invention is concerned with a new and useful antimicrobial agent and with fermentation processes for its production. This new antibiotic is known as PA 1008. Moreover, this invention relates to a process for the production of this antibiotic by fermentation, the method for its recovery and concentration from crude solutions including the fermentation broths, methods for its purification, and to this antibiotic in pure crystalline form. This invention includes within its scope the antibiotic, PA 1008, as crude concentrates and in purified forms. This novel product is especially useful in combatting microorganisms which are plant pathogens.

The product, PA 1008, is formed during the cultivation under controlled conditions of a new species of a microorganism isolated from the soil known as *Streptomyces griseofaciens sp. nov.* which is identified by planting and testing cultures thereof on media normally used for the identification of such microorganisms and by observing the growth and/or changes which occur incident thereto. The type culture is Pfizer culture number 16206–8. A living culture of this new species has been deposited with the American Type Culture Collection in Washington, D.C. and added to its collection of microorganisms as ATCC No. 13179. The new species resembles *Actinomyces farinosus* described in Krassilnikov's Guide to the Identification of Bacteria and Actinomycetes (translation), 1949. The present new species, however, produces grayish-white aerial mycelium on some media and even grayish-white sporulating areas on certain of the media used. *A. farinosus*, on the other hand, is described as having a white spore mass. Furthermore, Waksman in Bergey's Manual of Determinative Bacteriology, seventh edition, basing his key on the description of *A. farinosus* as given by Krassilnikov places this species in the group of organisms producing no soluble pigment in organic media. *S. griseofaciens* does produce soluble pigments on organic media. The cultural characteristics of *S. griseofaciens sp. nov.* are set forth in the following table. The cultural characteristics were recorded after two weeks of incubation at 28° C. on the media specified.

It is to be understood that the present invention embraces the use not only of the organism of the above description, which is given merely for illustrative purposes; but it also embraces the use of mutants produced from the described organism by means such as X-ray irradiation, ultraviolet irradiation, treatment with nitrogen mustards and the like. It is further to be understood that the invention includes the use of subcultures obtained by various standard microbiological techniques, such as the single colony and single spore isolation methods. Such mutants and/or subcultures may differ in certain respects from the above described new strain. It also includes use of organisms of this strain isolated from other sources.

PA 1008 has considerable activity against gram-positive microorganisms, especially those microorganisms that are pathogenic to plants. It is particularly active against *Phytomonas tumefaciens* which is responsible for crown gall. Crown gall is represented by a group of diseases in which the major infection on the host is hyperplasia and hypertrophy. Crown gall affects preferably fruits, for example, apple, peach, apricot, plums, grapes and the like. Crown gall usually consists of overgrowths varying gradually in size. Such galls occur normally on the subterranean roots of fruit trees and shrubs and may also appear on the grown stems or leaves of woody and herbaceous plants. The infections of the hosts usually result in the withering of leaves and fruits.

PA 1008 has been found most effective in inhibiting the growth of *Phytomonas tumefaciens*. In vitro tests were carried out to determine the minimum inhibitory concentration of PA 1008 against *P. tumefaciens*. The tests were carried out by the serial dilution technique. According to this technique, a nutrient medium was prepared containing the antibiotic PA 1008 at a concentration of 100 mcg./ml. Aliquots of this medium were next diluted with varied volumes of the inoculum so that the tubes containing PA 1008 at a concentration of 100, 50, 25, 12.5, 6.25, 3.12, 1.56, 0.78, 0.39, 0.19 mcg./ml. were obtained. These tubes were then incubated with the test organism, i.e. *P. tumefaciens* to determine the extent to which the microorganism grows in the presence of the antibacterial agent. In this fashion, the minimum inhibitory concentration of PA 1008 was found to be 0.19 mcg./ml.

In addition to its inhibitory activity against *P. tumefaciens* PA 1008 has also demonstrated considerable activity against *Erwinia amylovora*, a phytopathogen which

| Medium | Amount of Growth | Growth and Color of Aerial Mycelium | Color of Species | Soluble Pigment | Remarks |
|---|---|---|---|---|---|
| Pridham's Yeast Extract Agar | Excellent | Excellent; white | White to pale gray. | Lacking | Vegetative mycelium not visible; spores borne in long straight or slightly wavy chains; formed singly or in pairs; spores rarely oval to mostly cylindrical; 0.65–1.00 x 1.00–1.4μ; formed by segmentation. |
| Skimmed milk | Poor | Lacking | None | do | Vegetative mycelium cream to pale yellow; milk coagulated and moderately peptonized. |
| Glucose Agar | Moderate | do | do | Grayish-tan | Vegetative mycelium grayish-tan; growth finely convoluted at base of slant; reverse grayish-tan. |
| Nutrient Agar | do | do | do | Yellowish | Vegetative mycelium shiny, grayish-tan; slightly convoluted at base of slant; reverse grayish-tan. |
| Synthetic | Poor to Moderate. | Sparse; gray-white. | do | Lacking | Vegetative mycelium colorless; reverse cream; pin point type of growth. |
| Calcium-Malate | Moderate | Good; gray-white | do | do | Vegetative mycelium colorless; reverse cream color; pin point type of growth; malate digested. |
| Cellulose | do | White | do | do | |
| Potato plugs | do | Very sparse; grayish-white. | do | Light olive-gray. | Vegetative mycelium olive-gray; reverse olive-gray. |
| Starch Plates | do | Lacking | do | Lacking | Vegetative mycelium pale yellow; reverse pale yellow; zone of hydrolysis 2.0 cm. in diameter. |
| Gelatin Plates | Moderate to good. | Sparse; grayish-white. | do | Yellowish-olive. | Vegetative mycelium yellowish-olive; growth spreading; slight liquefaction. |
| Dextrose-Nitrate Broth | Moderate | do | do | Yellowish | Vegetative mycelium grayish-white; reduction of nitrates to nitrites completed and proceeded to free nitrogen or ammonia. |
| Glucose-Asparagine Plates | do | Sparse; white to pale gray. | Pale gray | Lacking | Vegetative mycelium colorless to cream to pale yellow; growth raised and convoluted; reverse cream to pale yellow. | is responsible for fire blight of pear and apple and, in addition, a number of species of the family, Roasceae, including some wild and orchard species. Fire blight causes blossoms to turn brown and leaves to develop lesions and further affects the twigs and withers shrubbery, discoloring twigs rapidly and turning shrubbery to characteristic brown color thus reducing the fruit growth. This is particularly a difficult problem to orchard and fruit growth wherein the total production of the orchard is diminished due to infection of the orchards by *E. amylovora*. The minimum inhibitory concentration of PA 1008 against *E. amylovora* was determined to be 50 mcg./ml. by a procedure identical to that described above.

Table 2 illustrates the activity of PA 1008 against a group of microorganisms which cause various diseases. A number of these microorganisms are resistant to other known antimicrobial agents. The tests were carried out by the serial dilution method described above. For each organism is given the minimum inhibitory concentration (MIC) of PA 1008 expressed in micrograms per milliliter.

TABLE 2

*Antimicrobial activity in vitro of PA 1008*

| Microorganism: | MIC (mcg./ml.) |
|---|---|
| *Micrococcus pyogenes* var. *aureus* | 0.78 |
| *Streptococccus pyogenes* | 0.19 |
| *Streptococcus faecalis* | 0.78 |
| *Diplococcus pneumoniae* | 0.19 |
| *Erysipelothrix rhusiopathiae* | 0.19 |
| *Corynebacterium diphtheriae* | 0.39 |
| *Listecia monocytogenes* | 0.78 |
| *Bacillus subtilis* | 0.39 |
| *Salmonella typhosa* | 50 |
| *Klebsiella pneumoniae* | 25 |
| *Nesseria gonnorheae* | 12.5 |
| *Hemophilus influenzeae* | 0.78 |
| *Shigella sonnei* | 50 |
| *Lactobacillus casei* | 0.19 |
| *Vibrio* | 0.19 |
| *Desulfvibrio desulfuricans* | 3.1 |
| *Salmonella pullorum* | 50 |
| *Bacterium ammoniagenes* | 0.19 |
| *Clostridium perfringens* | 0.19 |
| *Brucella bronchispetica* | 0.19 |
| *Malleomyces mallei* | 50 |
| Mycobacterium 607 | 0.78 |
| *Mycobacterium berolinense* | 3.1 |

Antibiotic resistant *Micrococcus pyogenes* var. *aureus* strains:

| | |
|---|---|
| 376 | 1.5 |
| Penicillin/r | 1.5 |
| 122/r | 0.78 |
| Erythromycin/r | 50 |
| Oxytetracycline/r | 1.5 |
| 93/4 | 0.39 |
| 400 | 1.5 |

This invention also includes processes for producing this new compound by growing *S. griseofaciens* ATCC 13179. The microorganism may be cultivated at temperatures ranging from about 23° C. to about 32° C. However, it is preferred to use temperatures of from about 26° C. to 30° C. The organism is best grown under submerged conditions of agitation and aeration on media containing a carbohydrate source such as sugars, starch and glycerol, an organic nitrogen source such as soy bean meal, cotton seed meal, peanut meal and cornsteep liquor and mineral salts such as sodium chloride, sodium nitrate, magnesium sulfate and potassium phosphate. In addition to these, a buffering agent such as calcium carbonate or potassium dihydrogen phosphate, and a foam preventer such as vegetable oils or animal oils may be used. The preferred pH range is from about 6 to 7. When the medium is adjusted to this point before fermentation, there is little change during the course of production of the antibiotics. During the fermentation the broths are agitated wtih stirrers of suitable design for incorporating air into the broth. Aeration at the rate of about ½ to 2 volumes of air per volume of broth per minute produces satisfactory results. About 1 to 3 days are required for the fermentation broths to reach maximum antibiotic potency.

Inoculum for the production of PA 1008 may be obtained by employing a growth from slants or Roux bottles inoculated with *S. griseofaciens* ATCC 13179. Suitable solid media for this initial growth are beef-lactose or Emerson's agar. This growth is used to inoculate either flasks or inoculum tanks. The time required to reach maximum growth will vary somewhat, but in general from about ½ to 3 days are sufficient. When inoculum tanks are used, the final broth containing a large amount of mycelium is used to inoculate the large fermenters. Of course, aseptic technique is used throughout to avoid contamination of the batch by undesired organisms.

The progress of antibiotic production is conveniently followed during fermentation by biological assay of the broth employing *B. subtilis*. Standard plate assay technique is employed in which the zone of inhibition surrounding a filter paper disc saturated with the broth is used as a measure of antibiotic potency. After the fermentation broth has reached a suitable antibiotic potency, the mycelium is filtered, ordinarily without pH adjustment. A diatomaceous aid such as Super-Cel greatly facilitates the filtration. Various types of equipment may be employed, for instance, filter presses, centrifuges, etc. The filtered broth may be used as such, or it may be spray dried to give a product which is useful for local application on plants or animals or in animal feeds. However, it is preferred to purify the material to some extent before using it.

Paper chromatography is convenient for analyzing the composition of crude materials which contain the PA 1008. A number of solvent systems have been used for the analysis of crude preparations or broths by paper chromatography. One such procedure employs Whatman's No. 4 filter paper, saturated with a 50% solution of formamide in methanol as the stationary phase, and a 3:1 solvent mixture of benzene and chloroform saturated with formamide as the mobile phase. This system gave the $R_f$ values of 0.89 for PA 1008 and 0.33 for its impurity.

In connection with paper chromatography as a criterion of homogeneity of the isolated antibiotic, bioautographic detection of antibiotic activity by means of agar plates seeded with *B. subtilis* is also employed. The antibiotic isolated by paper chromatography satisfied the bioautographic requirement for proof of homogeneity.

The antibiotic product is recovered from the fermentation broths by a number of different procedures including solvent extraction and column chromatography or combination thereof. Various organic solvents are useful in extracting PA 1008 from the filtered broth. Particularly effective solvents are ethyl acetate, methyl acetate, and methyl isobutylketone. Solvent extraction is preferably carried out using a volume of solvent approximately equal to the volume of broth from which it is desired to recover the antibiotic. It is often convenient to use two extractions, each with the volume of solvent being about ½ the volume of the broth. Various equipment such as separatory funnels, stirred tanks, and mechanical extracting devices such as centrifugal separators are helpful during the extractions.

One procedure which is satisfactory for obtaining an amorphous solid concentrate of the antibiotic PA 1008 involves solvent extraction of the filtered broth with ethyl acetate, concentration, preferably under reduced pressure, of the extract to 1/50 or 1/100 of the original volume, and precipitation of the product from the concentrate with several volumes of a non-solvent such as petroleum ether. The cream-colored solid so obtained represents most of the antibiotic activity due to PA 1008 and corresponds to about 200 mg./l of broth. Purified products are obtainable from such concentrates, either the solvent concentrate or the precipitated amorphous solid, by column chromatography on acid-washed alumina.

The preferred method of recovery for PA 1008 is as follows. The filtered broth is extracted by shaking it with an equal volume of ethyl acetate. The extract is concentrated under reduced pressure to remove almost all the solvent, and the residue is then subjected to countercurrent distribution between benzene, cyclohexane, 95% ethanol and water in a 5:5:8:2 ratio by volume. PA 1008 follows the organic phase while its impurities follow the aqueous phase. Distribution coefficients of the antibiotic and its impurities at 25° C. are 0.43 and 0.06 respectively in the above described solvent system. The phases are separated and solutions evaporated and the separated PA 1008 and its impurity recovered as the solid residue.

As mentioned above the novel antibiotic of this invention is useful in combatting *P. tumefaciens*. The antibacterial agent may be applied to the infected hosts in a variety of forms, for example, in suitable extending media, liquid or solid, which are well known in the art. For example, solutions or suspensions of the antibiotic in suitable solvents may be employed to introduce the agent into the host by root absorption. Alternatively, solid compositions containing the antibiotic in a solid extending agent, such as fullers earth, various types of clay, peatmoss and the like, may be advantageously applied to the roots of the host by conventional means. Solutions or suspensions of the antibiotic may be applied directly to the seat of infection, i.e. the gall, by conventional means. Treatment may be continued for as long as is required to combat the phytopathogen. The time required of course will vary with the host, the extent of infection and so forth.

The following examples are given by way of illustration and are not to be construed as limitations of this invention many variations of which are possible within the scope and spirit thereof.

*Example I*

A sterile, aqueous medium having the following composition was prepared.

| | Grams/liter |
|---|---|
| Dextrose hydrate | 10 |
| Starch | 10 |
| NZ-Amine B (enzymatic digest of casein) | 5 |
| Curbay (molasses residue) | 5 |
| NaCl | 5 |
| Soybean meal | 15 |
| $CaCo_3$ | 1 |

A slant culture of *S. griseofaciens* ATCC 13179, was transferred to 100 ml. of this medium in a 300 ml. Erlenmeyer flask and shaken 48 hours until good growth was obtained. Inoculum for a larger fermentation was prepared by transferring the contents of the aforesaid flask under sterile conditions to one liter of the same medium in a 3 liter flask and shaking the same for 48 hours.

Fifty gallons of sterile nutrient medium having the above described composition was prepared and then inoculated with inoculum thus prepared. The temperature was maintained at 28° C. and the broth was stirred and aerated at the rate of 1 volume of air per volume of broth per minute. After 48 hours, the broth was filtered and adjusted to pH 7.7. The broth was then extracted twice with one quarter volume of ethyl acetate. The combined solvent phases were concentrated to about one tenth volume under vacuum. The antibiotic was then extracted into water adjusted to pH 2 with sulfuric acid. The aqueous phase was separated, adjusted to pH 7 and extracted with ether several times. The ether solution, after drying over anhydrous sodium sulfate, was distilled to obtain the crude antibiotic as residue.

The crude antibiotic was purified by Craig countercurrent procedure in a solvent system composed (by volume) of benzene (5), cyclohexane (5), 95% ethanol (8) and water (2). The distribution coefficient of antibiotic PA 1008 is 0.43 in this system at 25° C.

Purified antibiotic PA 1008 melts at 121–123° C. and, on analysis, gives the following average proportions:

| | |
|---|---|
| Carbon | 59.9 |
| Hydrogen | 8.2 |
| Nitrogen | 1.99 |
| Oxygen (by difference) | 29.89 |

PA 1008 is a weakly basic compound. Titration in 50% ethanol gave a neutral equivalent of 760. The empirical formula calculates to $C_{38}H_{63}NO_{14}$.

PA 1008 is optically active, having a rotation of $$[\alpha]_D^{25} - 36.8° \text{ (c., 1\%, CHCl}_3\text{)}$$

Its ultraviolet absorption maximum has $$E_{cm.}^{1\%} 289 \text{ (279 m}\mu\text{) in CHCl}_3$$

and when dissolved in chloroform at a concentration of 0.6% exhibits characteristic absorption in the infrared region at the following frequencies expressed in reciprocal centimeters: 2857, 3401, 1712, 1669, 1623, 1587, 1453, 1408, 1359, 1342, 1163, 1117, 1079, 1049, 1026, 1014, 1001, 976, 913, 866, 835. The infrared spectrum of PA 1008 is illustrated in the attached drawing.

On standing for over 20 minutes at pH over 10, PA 1008 gradually consumes alkali. The antibiotic forms salts with both organic and inorganic acids, such as phosphoric, nitric, sulfuric, hydrochloric, tartaric, glycollic, citric, gluconic, malic, maleic succinic, glutaric, acetic and benzoic acids. The hydrochloride is precipitated from an ether solution of PA 1008 by the addition of alcoholic hydrogen chloride. The salts of PA 1008 possess antimicrobial activity.

What is claimed is:
1. A process for producing the antibiotic substance PA 1008 which process comprises cultivating the microorganism *S. griseofaciens* ATCC 13179 in an aqueous nutrient medium containing a source of carbohydrate, a source of organic nitrogen and inorganic salts, under submerged aerobic conditions until substantially antimicrobial activity is imparted to said medium.

2. A process as in claim 1 wherein the antibiotic substance is recovered from the fermentation broth.

3. A substance selected from the group consisting of PA 1008, a basic compound having a melting point of about 121–123° C. and an optical rotation of $$[\alpha]_D^{25} = -36.8°$$

at a concentration of 1% in chloroform, absorption maximum in the ultraviolet region of the spectrum at 279 m$\mu$ with $$E_{1cm.}^{1\%}$$

value of 289 when dissolved in chloroform, having the average composition by weight of 59.9% carbon, 8.2% hydrogen, 1.99% nitrogen and 29.89% oxygen (by difference) and when dissolved in chloroform at a concentration of 0.6% exhibits characteristic absorption in the infrared region at the following frequencies expressed in reciprocal centimeters: 2857, 3401, 1712, 1669, 1623, 1587, 1453, 1408, 1359, 1342, 1163, 1117, 1079, 1049, 1026, 1014, 1001, 976, 913, 866, 835, and the acid salts of said basic substance.

4. PA 1008, a basic compound having a melting point of about 121–123° C. and an optical rotation of $$[\alpha]_D^{25} = -36.8°$$

at a concentration of 1% in chloroform, absorption maximum in the ultraviolet region of the spectrum at 279 mμ with $$E_{1cm}^{1\%}.$$

value of 289 when dissolved in chloroform, having the average composition by weight of 59.9% carbon, 8.2% hydrogen, 1.99% nitrogen and 29.89% oxygen (by difference) and when dissolved in chloroform at a concentration of 0.6% exhibits characteristic absorption in the infrared region at the following frequencies expressed in reciprocal centimeters: 2857, 3401, 1712, 1669, 1623, 1587, 1453, 1408, 1359, 1342, 1163, 1117, 1079, 1049, 1026, 1014, 1001, 976, 913, 866, 835.

References Cited by the Examiner

Bergey's Manual of Determinative Bacteriology, 7th ed., pp. 788–789, Entry No. 80, Williams and Wilkins Co., Baltimore, 1957.

Raper et al.: Articles in New York Academy of Sciences Ar. 60, No. 1, October 29, 1954, pp. 5 and 24.

Sneath: J. Gen. Microbiol., August 1957, pp. 184–200.

Waksman: Bacteriological Reviews 21:1, pp. 1–29, March 1, 1957.

JULIAN S. LEVITT, *Primary Examiner.*

MORRIS O. WOLK, WILLIAM B. KNIGHT,
*Examiners.*